United States Patent
Samec et al.

(10) Patent No.: US 11,891,576 B2
(45) Date of Patent: Feb. 6, 2024

(54) PROCESSES FOR OBTAINING SUBSTANCES FROM BARK AND A COMPOSITION CONTAINING BARK FOR USE IN THE PROCESSES

(71) Applicant: KAT2BIZ AB, Stockholm (SE)

(72) Inventors: Joseph Samec, Stockholm (SE); Ivan Kumaniaev, Uppsala (SE)

(73) Assignee: KAT2BIZ AB, Stockholm (SE)

( * ) Notice: Subject to any disclaimer, the term of this patent is extended or adjusted under 35 U.S.C. 154(b) by 239 days.

(21) Appl. No.: 17/615,517

(22) PCT Filed: Jun. 26, 2020

(86) PCT No.: PCT/SE2020/050670
§ 371 (c)(1),
(2) Date: Nov. 30, 2021

(87) PCT Pub. No.: WO2020/263170
PCT Pub. Date: Dec. 30, 2020

(65) Prior Publication Data
US 2022/0306941 A1    Sep. 29, 2022

(30) Foreign Application Priority Data

Jun. 28, 2019 (SE) .................................. 1950818-3

(51) Int. Cl.
*C10G 3/00* (2006.01)
*C08H 8/00* (2010.01)
*C10G 1/04* (2006.01)

(52) U.S. Cl.
CPC ............. *C10G 1/047* (2013.01); *C08H 8/00* (2013.01); *C10G 3/50* (2013.01);
(Continued)

(58) Field of Classification Search
CPC .......... C10G 1/002; C10G 1/04; C10G 1/047; C10G 3/50; C10G 2300/1014;
(Continued)

(56) References Cited

U.S. PATENT DOCUMENTS

| | | | |
|---|---|---|---|
| 8,197,870 B2* | 6/2012 | Krasutsky | A61K 36/185 424/769 |
| 2016/0114307 A1* | 4/2016 | Downie | C10G 1/02 252/182.31 |
| 2017/0029739 A1 | 2/2017 | Chen et al. | |

FOREIGN PATENT DOCUMENTS

WO   WO 2007/045728 A1   4/2007
WO   WO 2009/114830 A2   9/2009
(Continued)

OTHER PUBLICATIONS

Chen et al., "Effect of ethanol on Mulberry bark hydrothermal liquefaction and bio-oil chemical compositions", Energy, 2018, 162: 460-475.
(Continued)

*Primary Examiner* — In Suk C Bullock
*Assistant Examiner* — Jason Y Chong
(74) *Attorney, Agent, or Firm* — James S. Keddie; Bozicevic, Field & Francis LLP

(57) ABSTRACT

Processes for obtaining substances from bark, especially bark high in suberin and lignin, which substances can be used for preparing biofuels are disclosed. The processes use a solvent system for dissolving the substances, which system can be recycled in the process. The solvent system comprises a base selected from tertiary aliphatic amines A composition comprising bark and the solvent system, which can be used in the processes, is also disclosed.

20 Claims, 4 Drawing Sheets

Lignin-suberin complex in tree bark
Insoluble crosslinked polymer

Solubilized mixture of oligomers
$M_N \sim 900$ Da, $M_W \sim 2600$ Da

Diesel range hydrocarbons
$<C> = 16.8$, $H/C = 1.83$, bp $271°C$ (52) U.S. Cl.
CPC ............... *C10G 2300/1014* (2013.01); *C10G 2300/4006* (2013.01); *C10G 2300/44* (2013.01); *C10G 2400/04* (2013.01)

(58) Field of Classification Search
CPC ........ C10G 2300/4006; C10G 2300/44; C10G 2400/04; C08H 8/00; C08H 6/00; Y02P 30/20; C08L 97/00
See application file for complete search history.

(56) References Cited

FOREIGN PATENT DOCUMENTS

| WO | WO 2014/197928 A1 | 12/2014 |
|---|---|---|
| WO | WO 2017/095316 A1 | 6/2017 |
| WO | WO 2017/219151 A1 | 12/2017 |

OTHER PUBLICATIONS

Karnaouri et al., "Effect of Different Pretreatment Methods on Birch Outer Bark: New Biorefinery Routes", Molecules, 2016, 21: 427, 16 pages.
Kumaniaev et al., "Valorization of Quercus suber Bark toward Hydrocarbon Bio-Oil and 4-Ethylguaiacol", ACS Sustainable Chemistry Engineering, 2018, 6: 5737-5742.
Pinto et al., "Quercus suber and Betula pendula outer barks as renewable sources of oleochemicals: A comparative study", Industrial Crops and Products, 2009, 29: 126-132.
Zhang et al., "Low Boiling Point Organic Amine-Catalyzed Transesterification for Biodiesel Production", Energy & Fuels, 2008, 22: 1353-1357.

* cited by examiner

PROCESSES FOR OBTAINING SUBSTANCES FROM BARK AND A COMPOSITION CONTAINING BARK FOR USE IN THE PROCESSES

CROSS-REFERENCE TO RELATED APPLICATIONS

This application is a § 371 national phase of International Application No. PCT/SE2020/050670, filed on Jun. 26, 2020, which claims the benefit of Swedish Application No. 1950818-3, filed on Jun. 28, 2019, which applications are incorporated by reference herein.

FIELD OF THE INVENTION

The present invention generally relates to processes for obtaining substances from bark, especially bark high in suberin and lignin, which substances can be used for preparing biofuels, and more particularly to such processes wherein a solvent system for dissolving the substances is used, which system can be recycled in the process. The invention also relates to a composition comprising bark and the solvent system, which can be used in the processes of the invention.

BACKGROUND OF THE INVENTION

Bark is an external tissue of plants. In the current technologies of biomass processing, such as Kraft pulping in paper industry, it is separated from trunks and treated as waste. Higher heating value of bark 21-24 $MJ \cdot kg^{-1}$ justifies its burning for electricity production, unless more advanced procedures are developed.

Bark tissue consists of various biopolymers, tannins, lignin, suberin, suberan and polysaccharides. Up to 40% of the bark tissue is made of lignin. While lignin is very abundant in other tissues as well, suberin is a specific component of bark and serves as a protective barrier of plant. Lignin is an aromatic polyether formed by oxidative coupling of sinapyl and coniferyl alcohols. Suberin is a poorly functionalized aliphatic polyester composed of hydroxylated fatty acids. Lignin and suberin domains are highly crosslinked and form an insoluble rigid network.

In any process for conversion of bark into chemicals and/or fuels, these polymeric substances must be partially depolymerized and solubilized in order to make them accessible to chemical modification. Methods of lignin extraction have been widely studied for other types of biomass. In particular, the organosolv procedure has been developed with an intention to provide a more environmentally friendly technique as an alternative to traditional Kraft pulping. In this type of processes, the biomass is treated with organic solvents (MeOH, EtOH, dioxane) mixed with water in presence of acids and other additives at 180-200° C. To address the emerging issues of lignin repolymerization, so-called lignin-first methodologies have been developed. The extracted lignin is subjected to in situ catalytic transformations and forms stable products, i.e. intermediates are directly trapped. A common example of lignin-first approach is metal-catalyzed hydrogenolysis where lignin is reduced into stable phenolic monomers.

In general, lignin-suberin complex is not depolymerized under typical organosolv extraction conditions and its cleavage requires alkaline treatment. The known procedures do not allow to recycle the solvent and thus make the process energetically inefficient. Moreover, the extracted bio-oil is contaminated with salts. There is thus a need for a solution where these drawbacks could be eliminated.

SUMMARY OF THE INVENTION

The present invention provides a solution that eliminates the drawbacks of the prior art that includes avoiding the use of metal catalyst and implementing a volatile base instead of alkaline salt.

The invention uses a solvent system comprising water, a base selected from tertiary aliphatic amines, and optionally a low boiling alcohol. The composition of the solvent system allows for recirculating the solvent system in the process. Moreover, the composition of the solvent system also allows for the solvent system to be evaporated in the process, e.g. for the purpose of separating the solvent system, for use in a second, and further cycles, of the process.

Accordingly, in a first aspect the invention relates to a process for at least partly dissolving in a solvent system substances of bark, which bark contains a suberin component, and for at least partly depolymerising the suberin component, comprising the following steps: providing bark; providing a solvent system comprising water, and a base selected from tertiary aliphatic amines; treating the bark with the solvent system by subjecting the bark to the solvent system at a temperature of at least 160° C., thereby obtaining a composition containing at least partly dissolved substances of bark, of which substances the suberin component is at least partly depolymerised.

In a second aspect the invention relates to a process for preparing a fuel, which process, in addition to the above steps, also comprises the following additional steps: subjecting the composition resulting from the treatment step to filtration, so as to separate from the composition any solid bark residues; separating by evaporation the solvent system from the filtrate obtained in the filtration step, so as to obtain a product mixture; and, hydrotreating the product mixture, thereby obtaining a fuel. In this aspect an alcohol is included in the solvent system.

In preferred embodiments of the inventive processes, the solvent system is recycled back to the treatment step. The used solvent system can be recycled by evaporation of the used system from the composition, however it is preferred that the solvent system is not evaporated from the composition until bark has been added to the solvent system corresponding to a lower limit of solvent to bark ratio of $V \approx 7$ $L \cdot kg^{-1}$. Accordingly, in the inventive processes, the composition is preferably recirculated back to the bark addition and treatment step until a total amount of bark has been added to the solvent system corresponding to a ratio of solvent system to bark of $V \approx 7$ $L \cdot kg^{-1}$ in the composition, at which point the solvent system is evaporated from the composition. Any solid bark residues in the composition is preferably separated by means of filtration from the composition before being recirculated to the treatment step.

In a preferred embodiment of the inventive process for preparing a fuel, the product mixture is mixed with, as a carrier liquid, a plant-derived oil, such as tall oil fatty acid (TOFA) or rapeseed oil. More preferably, the composition is a suspension of said mixture in TOFA.

Preferably, the hydrotreatment is performed by hydrodeoxygenation. In a preferred embodiment the hydrotreatment produces $C_9$-$C_{27}$ hydrocarbons, preferably $C_{15}$-$C_{19}$ hydrocarbons. The hydrotreatment may suitably be carried out at a temperature within a range of 300-400° C., preferably 340-380° C., and at a hydrogen pressure within a range of 40-100 bar, e.g about 50 bar. The duration of the hydrotreatment may e.g. be 1-3 hours.

In a third aspect the invention relates to a preferred composition, which can be used in the inventive processes, which composition comprises a mixture of bark having a particle size of not more than 3 mm in a solvent system, the solvent system comprising: water at a content of at least 40% by volume; triethylamine at a content of 4-20% by volume; and, methanol at a content of 40-50% by volume of the total volume of the solvent system.

In the inventive processes the substances of bark are at least partly dissolved in the solvent system, and of which substances the suberin component of bark is at least partly depolymerised.

Primary and secondary aliphatic amines are not suitable for use in the invention, since these form amides when reacting with esters. Ammonium is not suitable either.

The tertiary aliphatic amine is preferably a simple tertiary aliphatic amine, more preferably a trialkylamine, such as triethylamine ($Et_3N$), trimethylamine ($Me_3N$), dimethylethylamine, or diethylmethylamine, and most preferably triethylamine ($Et_3N$).

Preferably, the inventive solvent system further comprises an alcohol, preferably a low boiling alcohol such as methanol, ethanol, or propanol, or a mixture of low boiling alcohols, most preferably the alcohol is methanol.

In further preferred embodiments of the inventive processes, the degree of solubilization of the bark in the solvent system is at least 65%, preferably at least 90% and more preferably 90-95%.

In yet further preferred embodiments of the inventive processes, the composition obtained after the treatment step comprises a variety of oligomeric products of suberin and lignin, each molecule being composed of 4-10 monomeric units of lignin and/or suberin, and the whole mixture having the number-average molecular weight 900 Da and the weight-average molecular weight 2600 Da, according to SEC data.

Upon further treatment in alkaline conditions the bark containing composition affords a mixture of fatty acids having a chain length of 18-22 carbons, the fatty acids being saturated or unsaturated, and optionally substituted by at least one hydroxy group. Preferably the mixture of fatty acids includes at least two of 18-hydroxyoctadec-9-enoic acid, 1,18-octadec-9-enedioic acid, 1,18-octadecanedioic acid, 20-hydroxyeicosanoic acid, 1,20-eicosanedioic acid, 1,22-docosanedioic acid, 9,10-dihydroxyoctadecane-1,18-dioic acid, and 22-hydroxydocosanoic acid.

The inventive solvent system used preferably comprises from 4-20% by volume of the amine, more preferably 4-15%, even more preferably 7-12% by volume, and most preferably no more than 10% by volume of the amine.

The solvent system used according to the invention preferably comprises a low boiling alcohol. When present, the low boiling alcohol is preferably in an amount of up to 60% by volume, more preferably up to 50%. Preferably the alcohol is included in an amount of at least 40% by volume of the solvent system.

It is preferred that the solvent system comprises at least 40% by volume of water.

Preferably, the combined amounts of amine, water, and, when present, alcohol, constitute 100% by volume of the solvent system.

In a preferred embodiment the inventive solvent system comprises:
water at a content of at least 40% by volume;
triethylamine at a content of 4-20% by volume, preferably 4-15%, more preferably 7-12% by volume; and
methanol at a content of 0-50% by volume, preferably 40-50% by volume of the total volume of the solvent system.

The bark used in the invention is preferably bark having a high content of suberin and lignin, such as *Quercus suber* (oak) or *Betula pendula* (birch) bark, preferably *Betula pendula* bark.

In the inventive processes, the treatment temperature is preferably at least 180° C., and preferably up to 260° C., such as within a range of 200-240° C., more preferably within a range of 200-230° C., preferably at the most 220° C., and most preferably in the range of 200° C. to 220° C.

In the inventive processes, the heating is preferably performed for at least 0.3 hours, preferably for 1 to 3 hours, and most preferably for 1.5 to 2.5 hours.

The ratio of $MeOH:H_2O$ in the solvent system is preferably from 2:1 to 1:2 by volume, such as 1:1 by volume.

According to the invention, the bark is preferably in the form of finely divided particles, such as milled bark particles, preferably having a particle size of not more than 3 mm, more preferably around 1 mm or smaller. Preferably, the bark is a bark having a high content of suberin and lignin, such as *Quercus suber* or birch bark, preferably birch bark.

It is also preferable that the composition obtained as a result of the depolymerization reaction performed on the finely divided bark, for depolymerizing the suberin component of bark at least partly, in the process is subjected to filtration and any solid bark residues are separated and discarded. Preferably, the filtrate obtained by the filtration is recycled at least once and used as solvent system for the next portion of bark to be subjected to depolymerisation conditions for at least partly depolymerising the suberin component in the bark.

Preferably, the solvent system, after completion of the depolymerisation treatment of the bark for depolymerising at least partly the suberin component in the bark, is separated from the resulting reaction mixture by evaporation and recycled for use as solvent system for new portions of bark to be subjected to depolymerisation treatment for depolymerising at least partly the suberin component.

The inventors of the present invention have surprisingly found that by using the solvent system of the invention, it is possible to provide a salt- and metal-free solvent system that is recyclable and affords to solubilize bark, such as e.g. bark of birch (*Betula pendula*) to a very high degree (for birch bark 94% (91% of wax-free bark)). This clearly solves the problems of the prior art solutions.

DETAILED DESCRIPTION OF THE INVENTION

In the following, the present invention is explained in more detail, by way of example only, and should not be construed as limiting the scope of protection sought in the appended claims. In this detailed description it is referred to the following figures, wherein:

FIG. 4A is a diagram showing the results of a simulated distillation of the bio-oils obtained by the process of the invention; and, FIG. 4B is a diagram showing the 2D GC analysis of the distribution of obtained bio-oil components by carbon atom number.

The present inventors have developed a two-stage process and system for bark conversion into biofuel. According to a preferred embodiment the bark is birch bark. First, in a preferred embodiment, milled birch bark is treated with MeOH—$H_2O$-$Et_3N$ solvent system in a reactor or the like. The obtained mixture, containing bark solubilized in the solvent system and solid bark residue is filtered. The filtrate may be returned into the same reactor and thus play the role of the next portion of solvent system. The solid bark residue obtained in the filtration is discarded. The filtrate consists mainly of gum, comprising at least partly depolymerized suberin and other substances of bark ("depolymerized bark") dissolved in the solvent system.

After several runs of using the gum solution solubilized in the solvent system as solvent for new portions of milled bark, the solvent system MeOH—$H_2O$-$Et_3N$ is recycled by evaporation and returned to be used again as a pure solvent system consisting of MeOH, $H_2O$ and $Et_3N$. As a result of the evaporation a semi-solid gum is obtained. This semi-solid gum is subjected to hydrotreatment by hydrodeoxygenation, for example in the presence of a suitable hydrodeoxygenation catalyst, such as Pt/$TiO_2$/$Mo_3$, and $H_2$ gas or HCOOH. This second stage of the process leads to a reaction mixture comprising a variety of different hydrocarbon oils in the diesel-range that may be separated from each other through distillation. The reaction mixture resulting upon hydrotreatment is then distilled in order to obtain different hydrocarbons boiling at different temperatures.

The inventors of the present invention found that certain amines work surprisingly well in the invention. Ammonia, primary and secondary amines cannot be used because they form amides when reacting with esters.

Figure 1:
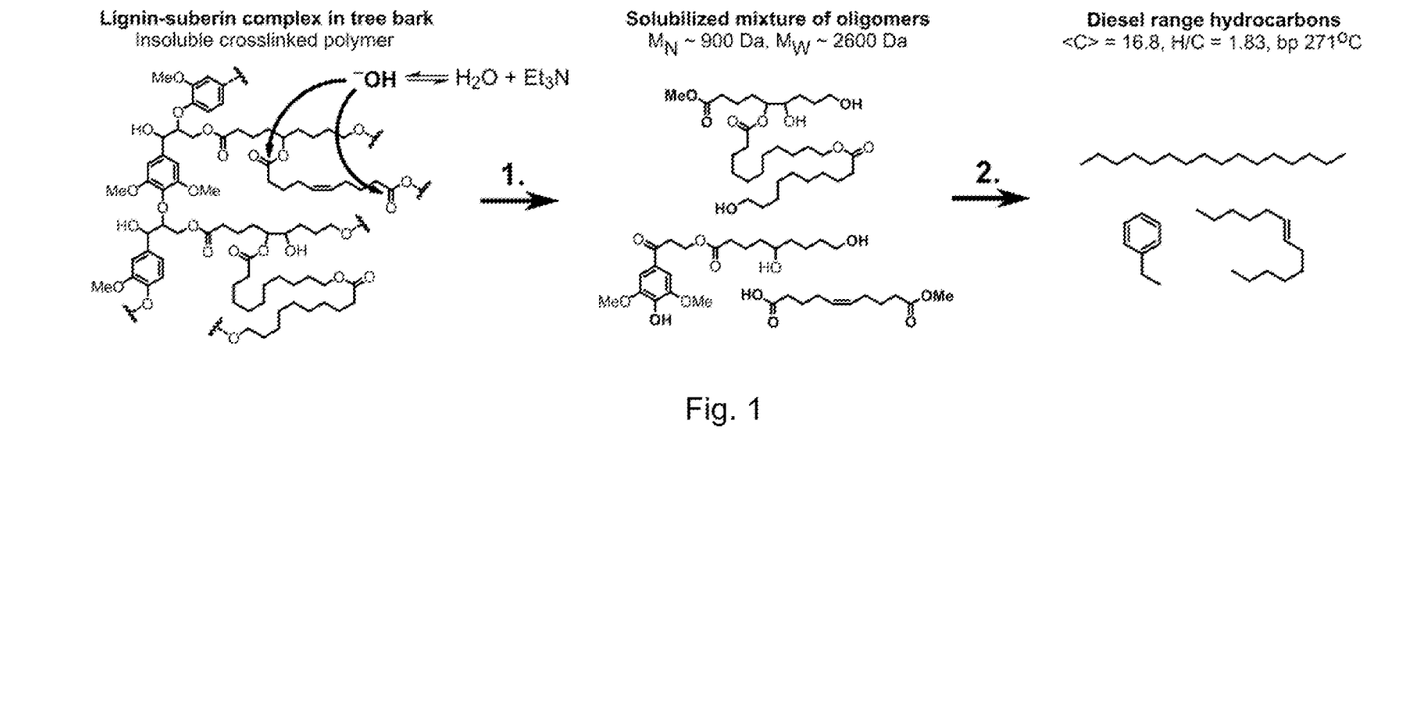
FIG. 1 depicts a reaction scheme describing the process steps of preparing biofuel from bark.

For the purpose described herein, the simple tertiary aliphatic amine $Et_3N$ (pKa 10.7) was found to be a surprisingly good choice as a component of the solvent system. In the presence of $Et_3N$ in organosolv pulping conditions, suberin was found to undergo alkaline hydrolysis (cf. FIG. 1A). After the solubilization of the substances of bark in the solvent system has been accomplished, $Et_3N$ can be easily removed by distillation (bp 89° C.) together with other components of the solvent system.

Mixtures of alcohols with water are suitable for the extraction of nonpolar components of biomass, such as lignin and suberin. Mixtures are more efficient than alcohol or water alone. MeOH can be recycled easier than any other alcohol due to its low boiling point (65° C.).

Optimization of the 1st Stage

Figure 2:
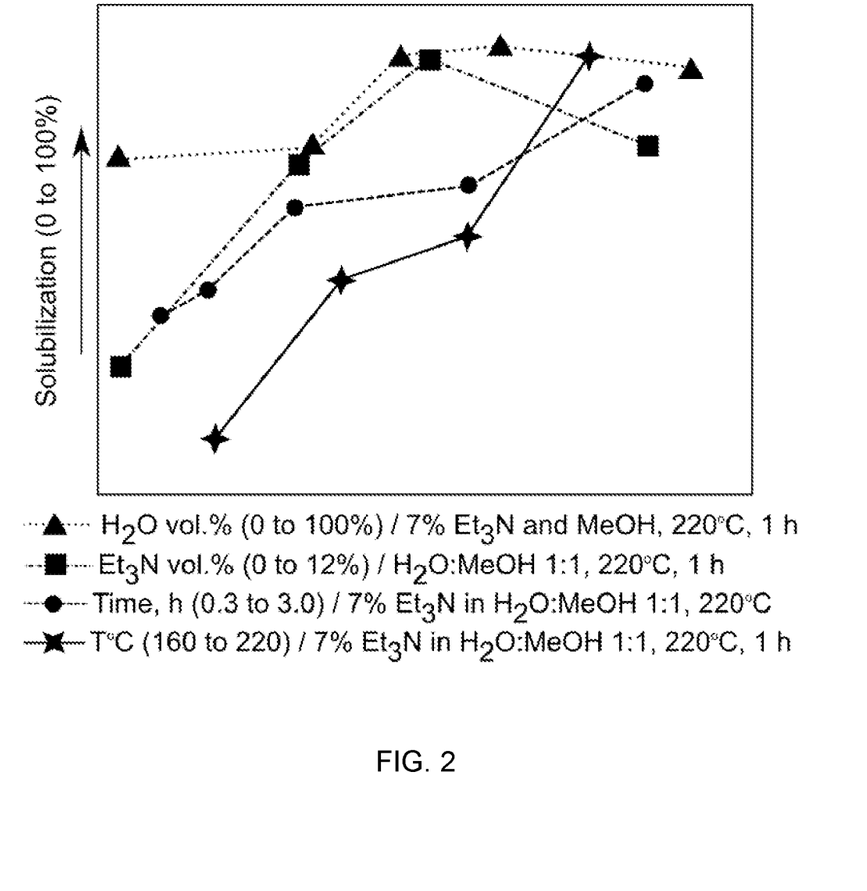
FIG. 2 is a diagram showing the influence of time, temperature, and content of water and triethylamine on bark solubilization.

Solubilization of the bark with the MeOH—$H_2O$-$Et_3N$ solvent system was optimized with regard to minimization of the mass of solid bark residue. The degrees of solubilization (%) are reported in relation to the mass of extractive-free bark (content of EtOH-extractives plus moisture is 29%). As a starting point, we treated the bark with MeOH—$H_2O$ (1:1 v/v or 46 vol. % $H_2O$) at 220° C. for 1 h in absence of $Et_3N$, in which conditions only 27% were solubilized (FIG. 2). Addition of 4 vol. % of $Et_3N$ improved the result toward 69%. Increase of $Et_3N$ concentration to 7 vol. % led to 91% solubilization. Further increase (12 vol. %) caused a decline of the solubilization degree (73%).

Using the optimized $Et_3N$ concentration (7 vol. %), we explored the role of water as component of the solvent system. If no water was added (i.e., $Et_3N$-MeOH mixture was used as the solvent system), the solubilization degree was lower than in case of MeOH—$H_2O$ 1:1 v/v, but still significant (70%). Addition of 30 vol. % of water did not affect this result (72%). When water became the major component with concentration of 60 vol. %, the degree of solubilization hits the maximum (93%). A $H_2O$-$Et_3N$ solvent system without MeOH led to a small decline of the result (89%) and was more difficult to handle during filtration. Therefore, if the content of water is higher than 46 vol. % its change does not affect the process. We decided to use 46 vol. % of water because presence of MeOH makes recycling of the solvent system as well as other operations such as filtration easier.

We also investigated the effect of temperature. When the process was carried out for 1 h with the optimized solvent system (MeOH—$H_2O$, 1:1.7 vol. % $Et_3N$) at 160° C., very poor solubilization was observed (13%). Increase of the temperature afforded better results: from 45% at 180° C. to 54% at 200° C. and, finally, 91% at 220° C.

Solvent System Recycling (Evaporation)

The solvent system was recycled 3 times by distillation in vacuum. The recycling and bark solubilization data are presented in Table 1 below. Composition of the solvent system after each recycling step was determined by NMR in acetone-$d_6$. It was observed that concentration of $Et_3N$ slightly decreases at each step, therefore it makes sense to start with higher concentrations of $Et_3N$ (~10%) when optimizing the process for industry. The recycled solvent was used for solubilization of new samples of bark. The data were in accordance with the obtained during optimization.

TABLE 1

Recycling of the solvent system by evaporation

| Number of run | Solvent system composition (vol. %) | | | Solvent system recovery (wt. %) [compared to initial mass] | Bark solubilization (wt. %) |
|---|---|---|---|---|---|
| | $Et_3N$ | MeOH | $H_2O$ | | |
| 1 | 7 | 47 | 46 | 94 [94] | 91 |
| 2 | 6 | 49 | 45 | 99 [93] | 92 |
| 3 | 6 | 48 | 46 | 99 [92] | 87 |
| 4 | 6 | 40 | 54 | — | 89 |

Solvent System Recycling (No Evaporation)

Due to the low density of bark packing in a reactor (150 kg·m$^{-3}$), the lower limit of solvent system to bark ratio is V≈7 L·kg$^{-1}$. It was found that until that point, for V=20, 15, 10 and 7 L·kg$^{-1}$, solubilization degree does not depend on this parameter, coming to 91, 92, 91 and 90%, respectively. Handling is more convenient with larger ratio V. However, evaporation of solvent system demands a sufficient amount of energy, ~1.7 MJ per liter of the solvent system. Therefore, and also because solvent system recycling by evaporation causes a slight decline of the yield (cf. Table 1), it would be beneficial to decrease V by using the solvent system several times before evaporation, i.e. using the solution for processing each portion of bark like in a looped flow system. Indeed, the presence of bark components in the solution did not affect its ability to solubilize new portions of bark: in three consecutive experiments with V=10 L·kg$^{-1}$, degrees of solubilization came to 91%, 90%, 90%. Thus, the efficient solvent system to bark ratio was reduced to 3.3 L·kg$^{-1}$. It must be noticed that filtration slows down significantly with each time as the solution becomes more concentrated and viscous, and it might lead to problems when putting the process on industrial scale.

Analysis of Gum

The gum obtained by "bark depolymerization" (i.e. bark wherein suberin component of bark has been at least partly depolymerized) contains a variety of oligomeric products of suberin and lignin cleavage. $M_W$=2630 Da, $M_N$=932 Da (PD=2.8), according to SEC data, i.e. an average dissolved molecule is composed of 4-5 monomeric units of lignin and/or suberin. Elemental composition of the material differs insignificantly from the composition of bark, however 1-2% of residual nitrogen is present. The material is insoluble in hexane, moderately soluble in toluene (28% of the gum weight) and well soluble in methanol (87% of the gum weight).

Noteworthy, the gum forms a suspension in tall oil fatty acid (TOFA) at 120° C. which remains practically stable at room temperature, therefore TOFA can be used as a carrier liquid in an industrial process of the gum hydrotreatment. Viscosity of the suspension at room temperature is 15-500 mPa·s for the concentration range 7-33 wt. % and temperature range 25-70° C.

Figure 3:
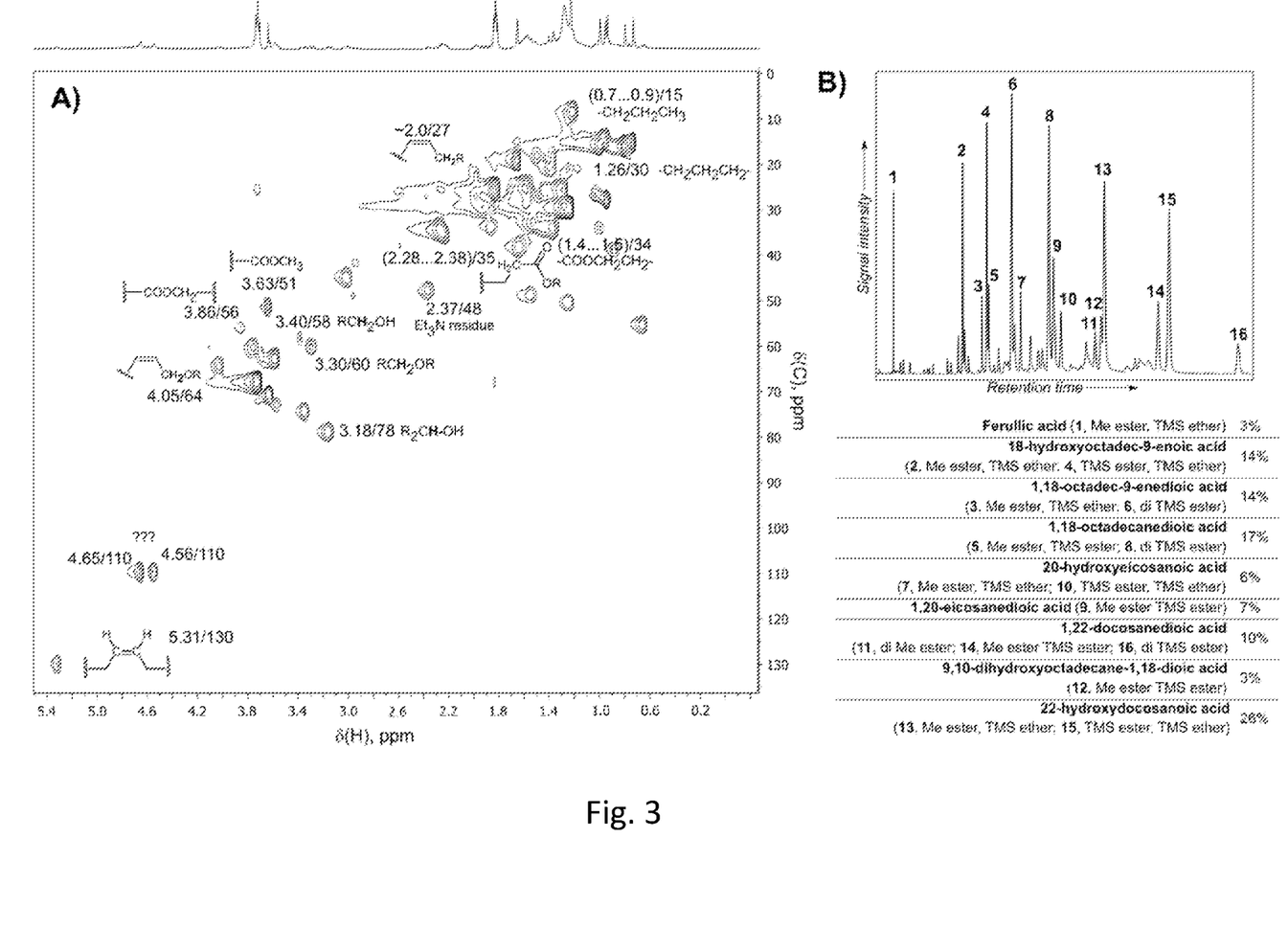
FIG. 3A is a diagram showing the results of HSQC NMR analysis of bark-derived gum.
FIG. 3B is a diagram showing the results of GC-MS analysis of methanolysated bark-derived gum.

HSQC NMR (cf. FIG. 3A) demonstrated presence of typical structural motifs of suberin. In order to analyze monomeric fatty acids, the gum was subjected to alkaline methanolysis, and the extract was studied by means of GC (FIG. 3B). A variety of $C_{16}$-$C_{22}$ hydroxylated carboxylic acids and diacids was identified, with the main components being 22-hydroxydocosanoic (26% TIC as silylated derivatives) and 1,18-octadec-9-enedioic (14%) acids. In addition, ferulic acid (3%) was detected.

Hydrodeoxygenation. Simdis and 2D GC

The gum was subjected to hydrodeoxygenation in the presence of Pt/MoO$_3$/TiO$_2$ catalyst at 360° C. Simulated distillation study of the obtained bio-oil showed that it contains hydrocarbons within the diesel range. The lightest components have boiling points of 70° C. and 90% of the mixture boils away before 350° C. (FIG. 4A).

Figure 4:
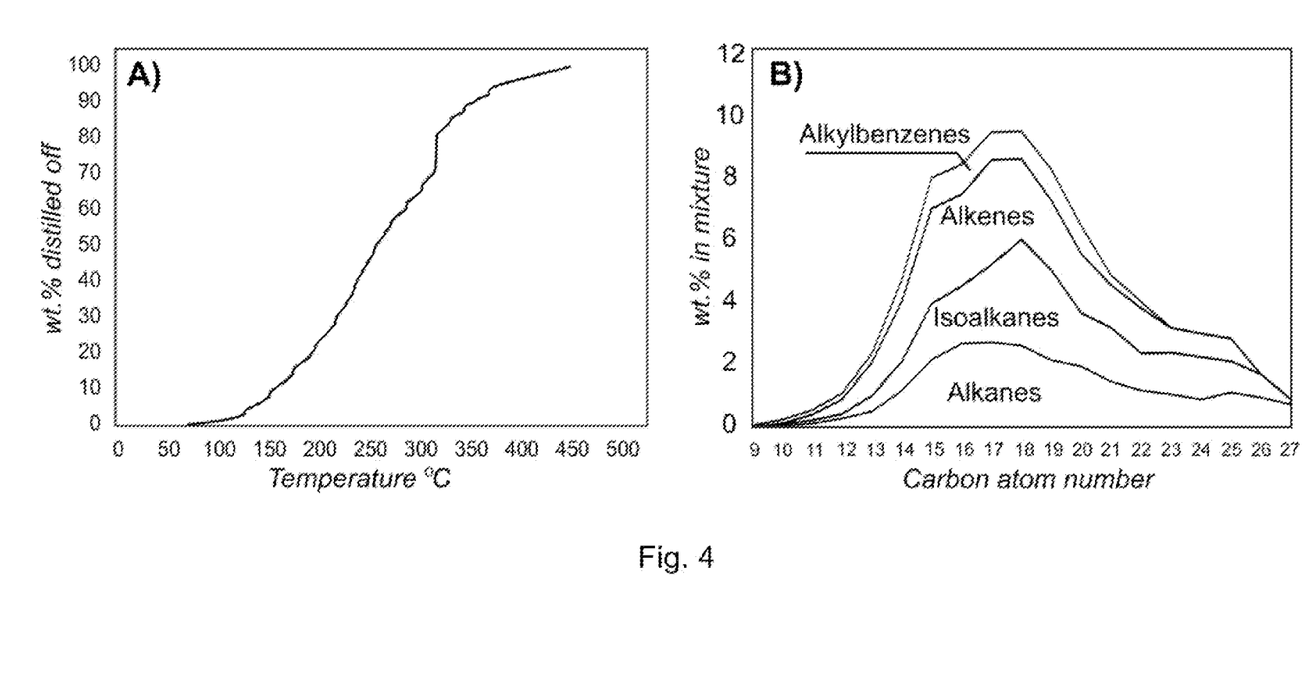

2D GC technique allowed to study different types of components of the mixture (FIG. 4B). The most abundant molecules are $C_{15}$-$C_{19}$ hydrocarbons. In the natural suberin, only fatty acids with even carbon atom numbers are present. Therefore, hydrocarbons with uneven chain length emerge due to cracking and/or decarboxylation processes. Higher aromatic compounds such as naphthalenes (20 wt. %) are probably also the products of cracking since their carbon atom numbers are generally lower than the ones of other observed hydrocarbons (average 14.4 versus 16.8 for the whole mixture). Unsaturated and monounsaturated hydrocarbons account for up to 73 wt. %, however, due to the presence of aromatic compounds the average number of double bonds and/or cycles per molecule for the whole mixture is 2.4 and H/C ratio is 1.83.

Yield of the obtained bio-oil is 40% of initial bark weight (56% of extractive-free bark). Carbon content in the bio-oil is 86%, as calculated through 2D GC data, and the carbon yield (the ratio of carbon which has been transferred from bark to the product) is 62%. Various types of bio-oil components and their content are presented in Table 2.

TABLE 2

Various types of bio-oil components and their content

| Component | wt. % | Number-average carbon atom number |
|---|---|---|
| n-Alkanes | 24.1 | 18.2 |
| Branched alkanes | 23.4 | 18.5 |
| Alkenes and cycloalkanes | 25.1 | 17.2 |
| Alkylbenzenes | 7.7 | 16.3 |
| Higher aromatics | 19.7 | 14.4 |
| Whole mixture | 100.0 | 16.8 |

Experiment 1

1. Analysis of the Bark Feedstock

The bark of birch (*Betula pendula*) was analysed.

1.1. Extractives & Moisture

A sample of bark was extracted with EtOH in Soxhlet extractor for 12 h and then dried in air at 50° C. for 12 h. Weight loss: 29% of bark weight. Mass of the EtOH-solubilized material: 26% of bark weight.

1.2. Suberin

Extractive-free bark sample (0.347 g) was treated with 3% MeONa solution in MeOH (25 mL) under reflux for 2 h. The solution was centrifugated and the residue was washed with MeOH and water. Centrifugation and washing were repeated until the pH became neutral. Solid residue was dried (0.131 g, 38% of extractive-free bark, 27% of total). Solution was acidified to pH 3 with H$_2$SO$_4$ and extracted with DCM (3×10 mL). The organic fraction was dried, filtered and concentrated to afford suberin oil (0.160 g, 46% of extractive-free bark, 33% of total).

1.3. Lignin

The solid residue which remained after alkaline methanolysis (extractive-free desuberized bark) was dried in air at 70° C. for 12 h. A sample (91 mg) was treated with 72% aqueous H$_2$SO$_4$ (1 mL) at 30° C. for 1 h. Then the mixture was diluted with water (30 mL) and refluxed for 3 h. After cooling to rt, the mixture was filtered through paper filter.

The filter was washed with water until a neutral pH was reached, and the residue was dried in air at 70° C. for 12 h to afford acid-insoluble lignin (51 mg, 21% of extractive-free bark, 15% of total).

1.4. Lignin S/G Ratio

A sample of untreated bark (50 mg) was placed into a stainless-steel reactor together with 3% aqueous KOH (3 mL) and nitrobenzene (0.1 mL). The reactor was heated with stirring at 170° C. for 1 h. After cooling, the mixture was acidified with HCl to pH 1 and extracted with DCM (3×5 mL). Combined organic fraction was dried with $Na_2SO_4$, diluted with $Et_2O$ and subjected to GC-MS. Method: Syringol and guaiacol units were detected as syringaldehyde and vanillin. Though the reproducibility of the method is low, syringol to guaiacol ratio was determined to be 2.2-2.7 based on three runs.

1.5. Carbohydrates

Analysis for carbohydrates was carried out according to previously published procedure; Kumaniaev, I.; Subbotina, E.; Sävmarker, J.; Larhed, M.; Galkin, M. V.; Samec, J. S. M. Lignin depolymerization to monophenolic compounds in a flow-through system. Green Chem. 2017, 19, 5767-5771. No carbohydrates were detected.

The results of the analysis of composition of the birch bark feedstock used are presented in Table 3 below.

TABLE 3

| Composition of birch bark feedstock | |
| --- | --- |
| Moisture | 3% |
| EtOH extractives | 26% |
| Suberin, hydrophilic monomers | 11% |
| Suberin, hydrophobic monomers | 33% |
| Klason lignin | 15% |
| Balance | 88% |

1.6. Elemental Analysis

The direct elemental analysis by combustion was performed on the birch bark feed stock. The following results were obtained: C, 70.1%; H, 9.2%; N, 0.3%; O, 19.5%.

2. Solubilization of Bark (Stage 1)

2.1. Experimental Procedure

Grinded birch bark (~1 mm particle size, 0.30 g) was placed into a stainless-steel reactor (internal volume 7 mL) together with a mixture of triethylamine (0.35 mL), methanol (2.32 mL) and water (2.33 mL) and a magnetic stirring bar. The reactor was heated at 220° C. in an oil bath for 2 hours with 800 rpm stirring. After cooling, the mixture was filtered through paper filter. The solid residue was dried at 60° C. for 12 hours and weighted (0.02 g, 6% of initial bark weight). The filtrate was distilled to recover the solvent system. The residual brown gum was dried in air at 60° C. or 130° C. for 12 hours (0.28 g, 94% of initial bark weight) and subjected to analyses.

2.2. Optimization

The procedure was optimized with regard to minimization of weight of the solid residue. Each experiment was repeated at least twice to address possible issues of samples' heterogeneity. The experimental data of these experiments are presented in Table 4 below. For graphical representation of the results, see FIG. 2.

TABLE 4

| Bark solubilization in MeOH—$H_2O$—$Et_3N$ | | | | | | |
| --- | --- | --- | --- | --- | --- | --- |
| # | Solvent system (MeOH—$H_2O$—$Et_3N$) v/v | Solvent system volume, mL (mL per g of bark) | T, ° C. | Time, h | Bark, g | % solubilized (of wax-free bark) | Deviation, % (+/−) |
| 1 | 46:47:7 | 4.5 (15) | 200 | 0.3 | 0.30 | 34 | 4 |
| 2 | 46:47:7 | 4.5 (15) | 200 | 0.5 | 0.30 | 38 | 5 |
| 3 | 46:47:7 | 4.5 (15) | 200 | 1.0 | 0.30 | 54 | 3 |
| 4 | 46:47:7 | 4.5 (15) | 200 | 2.0 | 0.30 | 58 | 9 |
| 5 | 46:47:7 | 4.5 (15) | 200 | 3.0 | 0.30 | 77 | 0 |
| 6 | 46:47:7 | 4.5 (15) | 160 | 0.5 | 0.30 | 13 | 0 |
| 7 | 46:47:7 | 4.5 (15) | 180 | 1.0 | 0.30 | 45 | 0 |
| 8 | 46:47:7 | 4.5 (15) | 220 | 1.0 | 0.30 | 79 | 1 |
| 9 | 46:47:7 | 4.5 (15) | 220 | 2.0 | 0.30 | 91 | 1 |
| 10 | 48:48:4 | 4.5 (15) | 220 | 2.0 | 0.30 | 69 | 1 |
| 11 | 50:50:0 | 4.5 (15) | 220 | 2.0 | 0.30 | 27 | 1 |
| 12 | 44:44:12 | 4.5 (15) | 220 | 2.0 | 0.30 | 73 | 2 |
| 13 | 62:31:7 | 4.5 (15) | 220 | 2.0 | 0.30 | 72 | 1 |
| 14 | 31:62:7 | 4.5 (15) | 220 | 2.0 | 0.30 | 93 | 0 |
| 15 | 0:93:7 | 4.5 (15) | 220 | 2.0 | 0.30 | 89 | 3 |
| 16 | 93:0:7 | 4.5 (15) | 220 | 2.0 | 0.30 | 70 | 1 |
| 17 | 46:47:7 | 4.5 (7.5) | 220 | 2.0 | 0.60 | 90 | 2 |
| 18 | 46:47:7 | 4.5 (10) | 220 | 2.0 | 0.45 | 91 | 4 |

2.3. NMR Spectroscopy 0.1 g of the gum was suspended in 0.6 mL of $CDCl_3$ at 60° C., the mixture was cooled to room temperature without filtration and subjected to NMR analysis. The spectra were recorded with a Bruker 400 (400 MHz) spectrometer as solutions in $CDCl_3$. Chemical shifts are expressed in parts per million (ppm, δ) and are referenced to $CHCl_3$ (δ=7.26 ppm) as an internal standard. $^{13}C$ NMR spectra were recorded as solutions in $CDCl_3$ with complete proton decoupling. Chemical shifts are expressed in parts per million (ppm, δ) and are referenced to $CDCl_3$ (δ=77.0 ppm) as an internal standard. 2D-NMR spectra were acquired on an Agilent 400-MR spectrometer. The standard Agilent implementations of gHSQCAD experiments were used. The results of the NMR spectroscopy analysis are presented in FIG. 3A.

2.4. Size Exclusion Chromatography

Size exclusion chromatography (SEC) was performed using a YL 9110 HPLC-GPC system with three Styragel columns (HR 0.5, HR 1, and HR 3, 7.8×300 mm each) connected in series (flow rate: 1 mL·min$^{-1}$; injection volume: 50 μL; THF), a UV detector (254 nm), and an autosampler. The system was calibrated using ReadyCal-Kit poly(styrene) ($M_P$ 266, 682, 1250, 2280, 3470, 4920, 9130, 15700, 21500, 28000, 44200, 66000 Da). Samples were dissolved in THF to a concentration of 0.5 g·L$^{-1}$.

The detected oligomers possess the following properties:
Molecular weight of the most abundant species $M_P$=1584 Da
Number average molecular weight $M_N$=932 Da
Weight average molecular weight $M_W$=2630 Da
Polydispersity index PD=$M_W/M_N$=2.82

TABLE 5

Solubility of the bark gum in various solvents (ca. 0.05 g in 1 mL)

| Solvent | Gum dissolved, wt % | Concentration of the solution, g · L$^{-1}$ |
|---|---|---|
| Hexane | 0 | 0 |
| Toluene | 28 | 16 |
| Ethyl acetate | 65 | 33 |
| Methanol | 87 | 48 |

2.5. Elemental Analysis

Gum dried at 60° C. in air: C, 66.7%; H, 10.2%; N, 2.1%; O, 21.4%.
Gum dried at 130° C. in air: C, 71.4%; H, 9.9%; N, 1.1%; O, 17.2%.

2.6. Tests for Solubility of the Gum

Solubility of the gum in various organic solvents was measured as follows. The gum (0.05 g) was treated with a solvent (1 mL) at 60-70° C. for 30 min, the solution was cooled 20° C. and filtered through a 0.2 μm syringe filter. Mass of the filtrate was measured. Then the filtrate was concentrated in vacuum and the residue dried in air at 60° C. for 12 hours. Mass of the residue was measured. The results of the tests on solubility of the bark gum in various solvents are presented in Table 5 below.

2.7. Suspension of the Gum in Tall Oil

Tall oil is a naturally occurring liquid mixture of fatty acids and rosins which has been demonstrated to be useful carrier liquid for hydrotreatment of biomass derivatives. For this purpose, viscosity of the mixture is crucial. The gum forms a suspension in tall oil fatty acids mixture (TOFA) at 120° C. which remains practically stable at room temperature. Viscosity of the suspension was measured with Anton Paar Rheolab QC rotational rheometer with a CC10 sensor (stirring rates 50 to 1400 s$^{-1}$). The viscosity data of the gum suspension in TOFA at different temperatures and concentrations is given in Table 6.

TABLE 6

Viscosity of the gum suspension in TOFA at different temperatures and concentrations (mPa · s)

|  | 25° C. | 50° C. | 70° C. |
|---|---|---|---|
| 7 wt. % | 13 | <10 | <10 |
| 16 wt. % | 120 | 35 | <10 |
| 33 wt. % | 500 | 125 | 44 |

2.8. 1D GC-MS of the Gum Methanolysate

1D GC was used for analysis of monomeric composition of the gum. A sample of the gum (0.1 g) was refluxed with 3% KOH/MeOH (5 mL) for 1 h. The mixture was acidified with HCl, diluted with water and extracted with $CHCl_3$ (3×10 mL). Combined organic phases were dried with $Na_2SO_4$, filtered and concentrated. A sample of the residue (10-20 mg) was dissolved in THF (1 mL) and silylated with bis(trimethylsilyl)acetamide (50 μL) in the presence of pyridine (50 μL). The solution was subjected to GC. GC measurements were performed on a Shimadzu Shimadzu GC-MS-QP2020 equipped with a HP-5 MS capillary column (30 m×0.25 mm×0.25 μm) and an MS detector. Compounds were identified by comparing the observed fragmentation patterns to literature data. MS spectra of each identified derivative are given in FIG. 3B.

Conclusions from Experiment 1

The inventors of the present invention have thus surprisingly found and shown in Example 1 that MeOH—$H_2O$—$Et_3N$ (46/47/7% v/v) forms a salt- and metal-free solvent system that is recyclable and affords to solubilize bark of birch (Betula pendula) to the degree of 94% (91% of wax-free bark). The obtained gum is composed of organosolv lignin and suberin oligomers and was characterized with HSQC NMR, elemental analysis, gas chromatography, and size exclusion chromatography. Hydrotreatment of the gum affords a hydrocarbon oil of diesel range (40% yield, bp 271° C., H/C=1.83, theoretical higher heating value 45-48 MJ·kg$^{-1}$) which was studied by means of simulated distillation and 2D GC.

Itemized Listing of Examples of Aspects and Embodiments of the Invention

Item 1: A composition comprising bark and a solvent system, wherein the substances of bark are at least partly dissolved in the solvent system, and of which substances the suberin component of bark is at least partly depolymerised, and wherein the solvent system comprises water, and a base in the form of an amine.

Item 2: The composition of item 1, wherein the aliphatic amine is a tertiary aliphatic amine.

Item 3: The composition of item 2, wherein the tertiary aliphatic amine is a simple tertiary aliphatic amine, preferably triethylamine ($Et_3N$), trimethylamine ($Me_3N$), dimethyl ethyl amine, diethyl methyl amine, most preferably triethylamine ($Et_3N$).

Item 4: The composition of any one of items 1-3, wherein the solvent system further comprises an alcohol, preferably a low boiling alcohol such as methanol, ethanol, or propanol, or a mixture of low boiling alcohols, most preferably the alcohol is methanol.

Item 5: The composition of any one of items 1-4, wherein the degree of solubilization of the bark in the solvent system is at least 65%, preferably at least 90% and more preferably 90-95%.

Item 6: The composition of any one of items 1-5, comprising a variety of oligomeric products of the suberin and/or lignin, each molecule being composed of 4-10 monomeric units of lignin and/or suberin, and the whole mixture having the number-average molecular weight 900 Da and the weight-average molecular weight 2600 Da, according to SEC data.

Item 7: The composition of any one of items 1-6, wherein the bark after further treatment in alkaline conditions affords a mixture of fatty acids having a chain length of 18-22 carbons, the fatty acids being saturated or unsaturated, and optionally substituted by at least one hydroxy group.

Item 8: The composition of any one of items 1-7, wherein the mixture of fatty acids includes at least two of 18-hydroxyoctadec-9-enoic acid, 1,18-octadec-9-enedioic acid, 1,18-octadecanedioic acid, 20-hydroxyeicosanoic acid, 1,20-eicosanedioic acid, 1,22-docosanedioic acid, 9,10-dihydroxyoctadecane-1,18-dioic acid, and 22-hydroxydocosanoic acid.

Item 9: The composition of any one of items 1-8, wherein the bark is bark having a high content of suberin and lignin, such as *Quercus suber* (oak) or *Betula pendula* (birch) bark, preferably *Betula pendula* bark.

Item 10: A process for preparing a composition of any one of items 1-8, comprising treating finely divided bark with the solvent system as defined in any one of items 1-9 in order to at least partly depolymerise the suberin component of bark.

Item 11: The process of item 10, wherein the treatment with the solvent system is performed at a temperature of at least 160° C. to obtain bark dissolved in the solvent system.

Item 12: The process of any one of items 10 and 11, wherein the treatment temperature is at least 180° C., preferably at the most 220° C., and most preferably in the range of 200° C. to 220° C.

Item 13: The process of any one of items 10 to 12, wherein the heating is performed for at least 0.3 hours, preferably for 1 to 3 hours, most preferably for 1.5 to 2.5 hours.

Item 14: The process of any one of items 10 to 13, wherein the ratio of $MeOH:H_2O$ in the solvent system is from 2:1 to 1:2 v/v.

Item 15: The process of any one of items 10 to 14, wherein the bark is in the form of finely divided particles, preferably milled bark particles preferably having a particle size of not more than 3 mm, preferably 1 mm or smaller.

Item 16: The process of any one of items 10 to 15, wherein the bark is bark having a high content of suberin and lignin, such as *Quercus suber* or birch bark, preferably birch bark.

Item 17: The process of any one of items 10 to 16, wherein the composition obtained as a result of the depolymerisation reaction performed on the finely divided bark in the process is subjected to filtration and any solid bark residues are separated and discarded.

Item 18: The process of any one of items 10 to 17, wherein the filtrate obtained by the filtration is recycled at least once and used as solvent for the next portion of bark to be subjected to depolymerisation conditions for at least partly depolymerising the suberin component in the bark.

Item 19: The process of any one of items 10 to 18, wherein the solvent system after completion of the depolymerisation treatment of the bark for depolymerising at least partly the suberin component in the finely divided bark is separated from the resulting reaction mixture by evaporation and recycled for use as solvent system for new portions of finely divided bark to be subjected to depolymerisation treatment for depolymerising at least partly the suberin component.

Item 20: A mixture comprising a variety of oligomeric products of suberin and lignin, each molecule being composed of 4-10 monomeric units of lignin and/or suberin.

Item 21: The mixture according to item 20 comprising fatty acids having a chain length of 18-22 carbons, the fatty acids being saturated or unsaturated, and optionally substituted by at least one hydroxy group.

Item 22: The mixture according to item 21, the mixture of fatty acids including at least two of 18-hydroxyoctadec-9-enoic acid, 1,18-octadec-9-enedioic acid, 1,18-octadecanedioic acid, 20-hydroxyeicosanoic acid, 1,20-eicosanedioic acid, 1,22-docosanedioic acid, 9,10-dihydroxyoctadecane-1,18-dioic acid, and 22-hydroxydocosanoic acid.

Item 23: A composition suitable for preparation of fuel, comprising a mixture according to anyone of items 20-22 and a carrier liquid suitable for use in fuel preparation.

Item 24: The composition according to item 23, wherein the carrier liquid is a plant-derived oil, such as tall oil fatty acid (TOFA) or rapeseed oil.

Item 25: The composition according to item 24, wherein the composition is a suspension of said mixture in TOFA.

Item 26: A process for preparing fuel, comprising a step of hydrotreating the mixture of anyone of the items 20-22 or the composition of anyone of the items 23-25.

Item 27: The process according to item 26, wherein the hydrotreatment is performed by hydrodeoxygenation.

Item 28: The process according to item 26 or 27, wherein the hydrotreatment produces $C_9$-$C_{27}$ hydrocarbons, preferably $C_{15}$-$C_{19}$ hydrocarbons.

Item 29: The process according to any one of items 26 to 28, wherein the process prior to the hydrotreatment step incorporates the steps of the process according to anyone of the items 10-19.

Item 30: A biofuel obtainable by the process of anyone of the items 26 to 29.

The invention claimed is:

1. A process for at least partly dissolving bark containing a suberin component in a solvent system and for at least partly depolymerizing the suberin component, the process comprising the following steps:
   providing bark;
   providing a solvent system comprising water and a base selected from tertiary aliphatic amines;
   treating the bark with the solvent system by subjecting the bark to the solvent system at a temperature of at least 160° C., thereby obtaining a composition containing at least partly dissolved substances of bark, of which substances the suberin component is at least partly depolymerized.

2. The process of claim 1, wherein the tertiary aliphatic amine is a simple tertiary aliphatic amine.

3. The process of claim 1, wherein the bark is *Quercus suber* (oak) or *Betula Pendula* (birch) bark.

4. The process according to claim 1, wherein the heating temperature is at least 180° C.

5. The process according to claim 1, wherein the heating is performed for at least 0.3 hours.

6. The process of claim 1, wherein the solvent system further comprises an alcohol.

7. The process according to claim 6, wherein the ratio of MeOH:H$_2$O in the solvent system is from 2:1 to 1:2 v/v.

8. The process of claim 1, wherein the solvent system comprises:
  water at a content of at least 40% by volume;
  triethylamine at a content of 4-20% by volume; and
  methanol at a content of 40-50% by volume of the total volume of the solvent system.

9. The process according to claim 1, wherein the bark is in the form of finely divided bark having a particle size of not more than 3 mm.

10. The process according to claim 1, additionally comprising, after the treatment step, the following step of:
  recirculating, at least once, the composition obtained after the treatment step, back to the treatment step, for use as solvent system for the next portion of bark to be subjected to treatment conditions in a next treatment step.

11. The process of claim 10, wherein recirculation of the composition obtained after the treatment step is carried out until a total amount of bark has been added to the solvent system corresponding to a lower limit of solvent to bark ratio of about 7 L·kg$^{-1}$.

12. The process according to claim 1, additionally comprising, after the treatment step, the step of:
  subjecting the composition resulting from the treatment step to filtration so as to separate from the composition any solid bark residues.

13. The process according to claim 12, additionally comprising, after the filtration step, the step of:
  separating by evaporation the solvent system from the composition resulting from the treatment step, and recirculating the separated solvent system for use in the treatment step.

14. A process for preparing a fuel, comprising the following steps:
  providing bark containing a suberin component;
  providing a solvent system comprising water, an alcohol, and a base selected from tertiary aliphatic amines;
  treating the bark with the solvent system by subjecting the bark to the solvent system at a temperature of at least 160° C., thereby obtaining a composition containing at least partly dissolved substances of bark, of which substances the suberin component is at least partly depolymerized;
  subjecting the composition resulting from the treatment step to filtration, so as to separate from the composition any solid bark residues;
  separating by evaporation the solvent system from the filtrate obtained in the filtration step, so as to obtain a product mixture; and
  hydrotreating the product mixture, thereby obtaining a fuel.

15. The process of claim 14, comprising the additional step of:
  admixing the product mixture to be hydrotreated with, as a carrier liquid, a plant-derived oil.

16. The process of claim 15, wherein the product mixture to be hydrotreated is suspended in the carrier liquid.

17. The process according to claim 14, wherein the hydrotreatment is performed by hydrodeoxygenation.

18. A composition comprising a mixture of bark in a solvent system, the solvent system comprising:
  water at a content of at least 40% by volume;
  triethylamine at a content of 4-20% by volume; and
  methanol at a content of 40-50% by volume,
  of the total volume of the solvent system.

19. The composition of claim 18, wherein the bark is in the form of finely divided bark having a particle size of not more than 3 mm.

20. The composition of claim 18, wherein a ratio of solvent system to bark, in terms of volume of solvent system to weight of bark, is less than about 20 L/kg.

* * * * *